(12) United States Patent
Munetoh

(10) Patent No.: US 11,093,429 B1
(45) Date of Patent: Aug. 17, 2021

(54) DAISY-CHAINED SERIAL BUS FOR MULTIPLE SMALL FOOTPRINT DEVICES

(71) Applicant: INTERNATIONAL BUSINESS MACHINES CORPORATION, Armonk, NY (US)

(72) Inventor: Seiji Munetoh, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/777,786

(22) Filed: Jan. 30, 2020

(51) Int. Cl.
*G06F 13/40* (2006.01)
*G06F 13/24* (2006.01)

(52) U.S. Cl.
CPC .......... *G06F 13/4068* (2013.01); *G06F 13/24* (2013.01)

(58) Field of Classification Search
CPC .. G06F 21/606; G06F 13/362; G06F 13/4022; G06F 13/404; G06F 13/4247; G06F 13/4282
USPC ............................................................. 710/9
See application file for complete search history.

(56) References Cited

U.S. PATENT DOCUMENTS

| | | | | |
|---|---|---|---|---|
| 4,729,095 A * | 3/1988 | Colley | ................ | G06F 15/8007 712/203 |
| 5,204,669 A * | 4/1993 | Dorfe | ................... | G06F 12/0676 340/12.23 |
| 5,615,219 A * | 3/1997 | Keating | ............. | G01R 31/2801 348/E17.001 |
| 5,938,742 A * | 8/1999 | Faddell | ............... | G06F 13/4256 710/260 |
| 6,636,524 B1 * | 10/2003 | Chen | ....................... | H04L 47/15 370/390 |
| 6,754,720 B1 * | 6/2004 | Packer | ................ | G06F 12/0661 709/234 |
| 6,928,501 B2 * | 8/2005 | Andreas | .............. | G06F 13/4256 370/404 |
| 7,664,018 B2 * | 2/2010 | Warren | ................. | H04L 12/433 370/230 |
| 8,433,874 B2 * | 4/2013 | Oh | ...................... | G06F 12/0653 711/167 |

(Continued)

OTHER PUBLICATIONS

Raatz, Nathan, "Connectors—The Basics", Apr. 12, 2018, Digi-Key, retrieved from the Internet on Feb. 22, 21 at <https://www.digikey.com/en/articles/connectors-the-basics>.*

(Continued)

*Primary Examiner* — Faisal M Zaman
(74) *Attorney, Agent, or Firm* — Tutunjian & Bitetto, P.C.; Randall Bluestone

(57) ABSTRACT

An apparatus for data transfer includes a first node connected to a bus to communicate bidirectionally, and second nodes connected in series to the bus. Each second node lacks an internal clock and has fixed pads including a power, a ground, and signal pads to transfer a data frame, return data pads for a return signal, select pads for a selection signal and clock pads for a clock signal. Each second node is indexed by a hop count in the frame that is incremented each time the frame is transferred in topological order. Each second node is selectable using a mode defined by a combination of the hop count, a mask field and an address field in the frame. The signal pads are used for frame transfer in a selected mode controlled by a combination of the selection, clock and return signals.

23 Claims, 15 Drawing Sheets

(56) References Cited

U.S. PATENT DOCUMENTS

| | | | |
|---|---|---|---|
| 10,587,064 B1* | 3/2020 | Consoli | H01R 13/4534 |
| 2006/0045099 A1* | 3/2006 | Chang | H04L 69/16 |
| | | | 370/400 |
| 2006/0075067 A1* | 4/2006 | Blackmore | H04L 69/16 |
| | | | 709/217 |
| 2009/0047453 A1* | 2/2009 | Folaron | F41J 5/06 |
| | | | 428/34.1 |
| 2009/0092176 A1* | 4/2009 | Zhou | H04B 3/38 |
| | | | 375/211 |
| 2016/0205066 A1 | 7/2016 | Attarwala et al. | |
| 2016/0342546 A1* | 11/2016 | Sonnaillon | H02J 1/00 |
| 2019/0095370 A1* | 3/2019 | Fuchs | G06F 13/362 |

OTHER PUBLICATIONS

Amin, "Daisy Chain Implementation for Serial Peripheral Interface", Texas Instruments, Application Report, Aug. 2018, 7 pages.
Anonymous, "I2C Daisy Chain Addressing with Multipurpose Interrupt", An IP.com Prior Art Database Technical Disclosure, Feb. 2014, 3 pages.
Maxim Integrated Products, "Daisy-Chaining SPI Devices", Application Note 3947, Dec. 2006, pp. 1-8.

* cited by examiner

DAISY-CHAINED SERIAL BUS FOR MULTIPLE SMALL FOOTPRINT DEVICES

BACKGROUND

The present invention generally relates to integrated circuits, and more particularly to a daisy-chained serial bus for multiple small footprint devices.

SUMMARY

According to an aspect of the present invention, an apparatus for data transfer is provided. The apparatus includes a first node connected to a bus to communicate bidirectionally. The apparatus further includes a plurality of second nodes connected in series to the bus. Each of the plurality of second nodes lacks an internal clock and has fixed pads including a power pad, a ground pad, signal pads to transfer a data frame, return data pads for a return signal, select pads for a selection signal and clock pads for a clock signal. Each of the signal pads, the return data pads, the select pads and the clock pads include respective input pads and output pads. Each of the plurality of second nodes is indexed by a hop count in the data frame. The hop count is incremented each time the data frame is transferred from the first node to each respective one of the plurality of seconds nodes in topological order. Each of the plurality of second nodes is selectable using an addressing mode defined by a combination of the hop count, a mask field and an address field in the data frame. The signal pads are used for data transfer of the data frame in a selected node mode controlled by a combination of the selection signal, the clock signal and the return signal.

According to another aspect of the present invention, a method for data transfer is provided. The method includes providing a first node connected to a bus to communicate bidirectionally. The method further includes providing a plurality of second nodes connected in series to the bus. Each of the plurality of second nodes lacks an internal clock and has fixed pads including a power pad, a ground pad, signal pads to transfer a data frame, return data pads for a return signal, select pads for a selection signal and clock pads for a clock signal. Each of the signal pads, the return data pads, the select pads and the clock pads include respective input pads and output pads. Each of the plurality of second nodes is indexed by a hop count in the data frame. The hop count is incremented each time the data frame is transferred from the first node to each respective one of the plurality of seconds nodes in topological order. Each of the plurality of second nodes is selectable using an addressing mode defined by a combination of the hop count, a mask field and an address field in the data frame. The signal pads are used for data transfer of the data frame in a selected node mode controlled by a combination of the selection signal, the clock signal and the return signal. According to yet another aspect of the present invention, an apparatus for data transfer is provided. The apparatus includes a first node connected to a bus to communicate bidirectionally. The apparatus further includes a plurality of second nodes connected in series to the bus. Each of the plurality of second nodes lacks an internal clock and has fixed pads including a power pad, a ground pad, signal pads to transfer a data frame, return data pads for a return signal, select pads for a selection signal and clock pads for a clock signal. Each of the signal pads, the return data pads, the select pads and the clock pads include respective input pads and output pads. Each of the plurality of second nodes is indexed by a hop count in the data frame. The hop count is incremented each time the data frame is transferred from the first node to each respective one of the plurality of seconds nodes in topological order. Each of the plurality of second nodes is selectable using an addressing mode defined by a combination of the hop count, a mask field and an address field in the data frame. The signal pads are used for data transfer of the data frame in a selected node mode selected from (i) a first node mode for indicating that the signal pins are used for data transfer, responsive to the selection signal being active, (i) a second node mode for resetting the plurality of second nodes by the first node, responsive to the selection signal being inactive and the clock signal being active, and (iii) a third node mode for generating an interrupt by any of the plurality of second nodes, responsive to the selection signal being inactive and the return signal being active. These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a daisy-chained serial bus for multiple small footprint devices.

In an embodiment, the present invention provides a serial bus system with controlling and nodes with the following:
- a fixed footprint (fixed PAD assignment) for both controlling and controlled nodes;
- a fixed footprint for line and ring topology of node alignment; and
- controlling and controlled-end (leaf node) selection by using a signal PAD (no additional PAD is required to define the node type).

In an embodiment, the present invention provides a node indexed by "hop count" (in device topological order). A frame (e.g., a High level Data Link Control (HDLC) frame) can be used for data transfer. The frame can have a "hot count" field (e.g., one byte for a 256 node chain). For a controlling to controlled side transfer, each node increments the hop count field before passing the frame to the next node in topological order (controlling to end controlled). For a controlled to controlling side transfer, each node decrements the hop count before passing the frame to the next node in reverse topological order (end controlled to controlling).

In an embodiment, a node can be selected by "hop count", a mask field, and an address field which can be used to support the following three addressing modes:
- single node selection (hop count==address field);
- group selection (hop count & mask field==address field & mask field); and
- broadcast (all).

In an embodiment, node configuration can be performed by signal pads. The signal pads are also used for node mode selection and interrupts. In an embodiment, signal pad usage is controlled by one or more of the select, clock, and return signals as follows:
- select on=>signals pins are used for data transfer;
- select off+clock=>controlling resets controlled nodes; and
- select off+return data path is high=>interrupt from controlled (level sensitive, does not require clock drive by controlling)

Embodiments of the present invention provide a lower pin count over prior art apparatuses. For example: a lower pin count is provided by the following:
- using signal pins to select the operation mode (controlling/controlled/controlled end) controlled 1-2 PINs;
- using signal pins for interrupt saves 1 PIN, controlling 1 or n PINs; and
- using hop count to address the target node saves 1-8 PINs or using a prefixed ID.

Figure 1:
FIG. 1 is a block diagram showing exemplary pad descriptors, in accordance with an embodiment of the present invention.

Embodiments of the present invention provide a unified footprint for various node connection topologies. For example, the same device can be used for line and ring topology alignment. FIG. 1 is a block diagram showing exemplary pad descriptors 110, in accordance with an embodiment of the present invention.

The pad descriptors 110 include the following: VDD; GND; SELI; SELO; CLKI; CLKO; SDI; SDO; RDI; and RDO. The pad descriptors 110 are provided in table 100 with the following additional information/columns: dir (directive) 120; description 130; SEL=1 140, and SEL=0 150.

Figure 2:
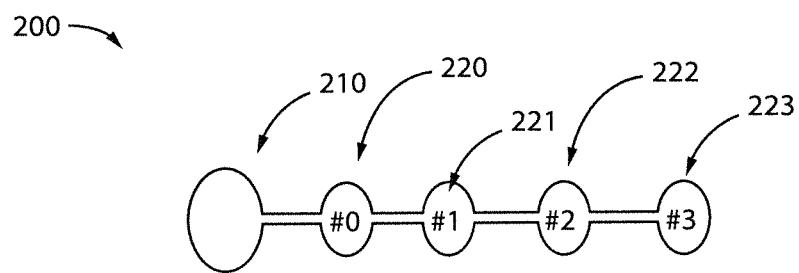
FIG. 2 is a block diagram showing an exemplary daisy-chained serial bus in a single line topology, in accordance with an embodiment of the present invention.

FIG. 2 is a block diagram showing an exemplary daisy-chained serial bus 200 in a single line topology, in accordance with an embodiment of the present invention.

The daisy-chained serial bus 200 include a controlling node 210 and controlled nodes #0-#3 220-223.

Figure 3:
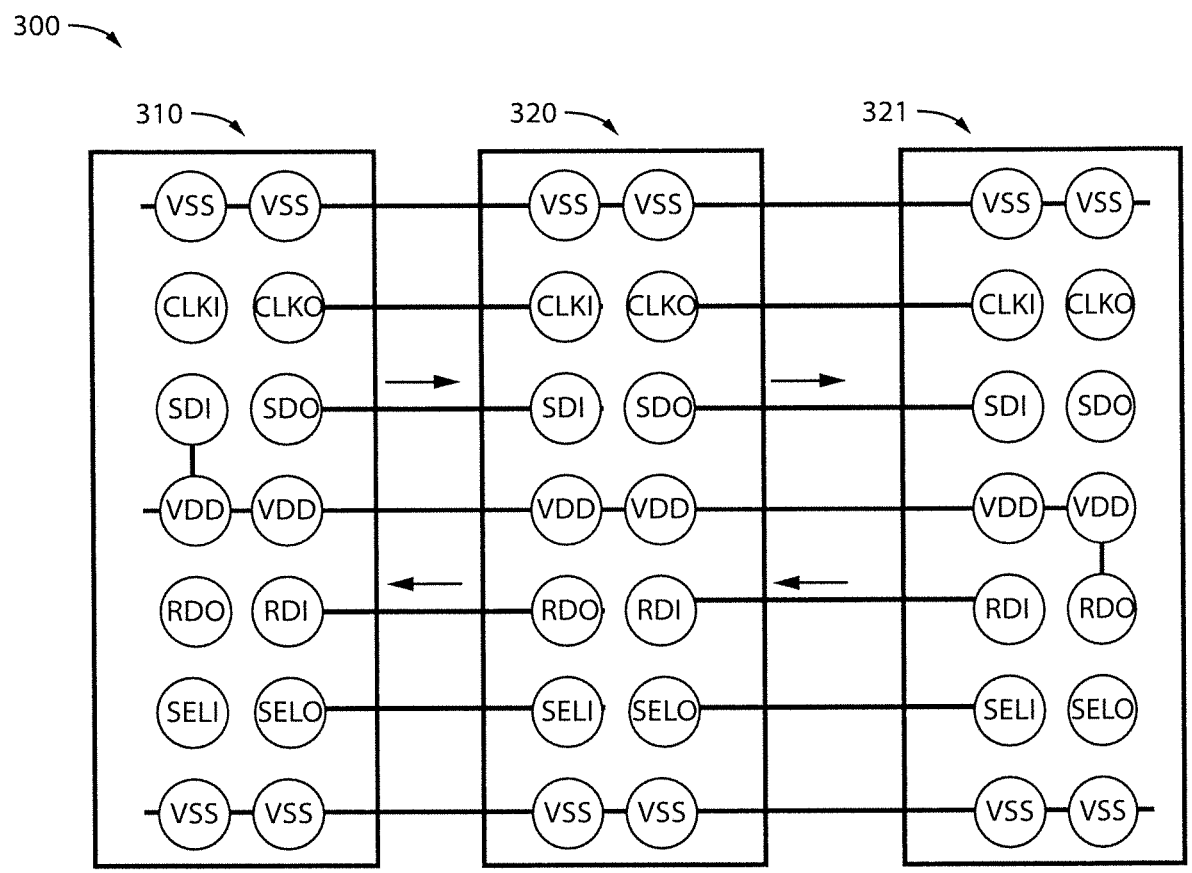
FIG. 3 is a block diagram showing an exemplary daisy-chained serial bus having an I/O pad layout and wire connections in a line topology, in accordance with an embodiment of the present invention.

FIG. 3 is a block diagram showing an exemplary daisy-chained serial bus 300 having an I/O pad layout and wire connections in a line topology, in accordance with an embodiment of the present invention.

The daisy-chained serial bus 300 includes a controlling node 310, a controlled node #0 320, and controlled (end) node #1 321. VSS denotes ground.

Figure 4:
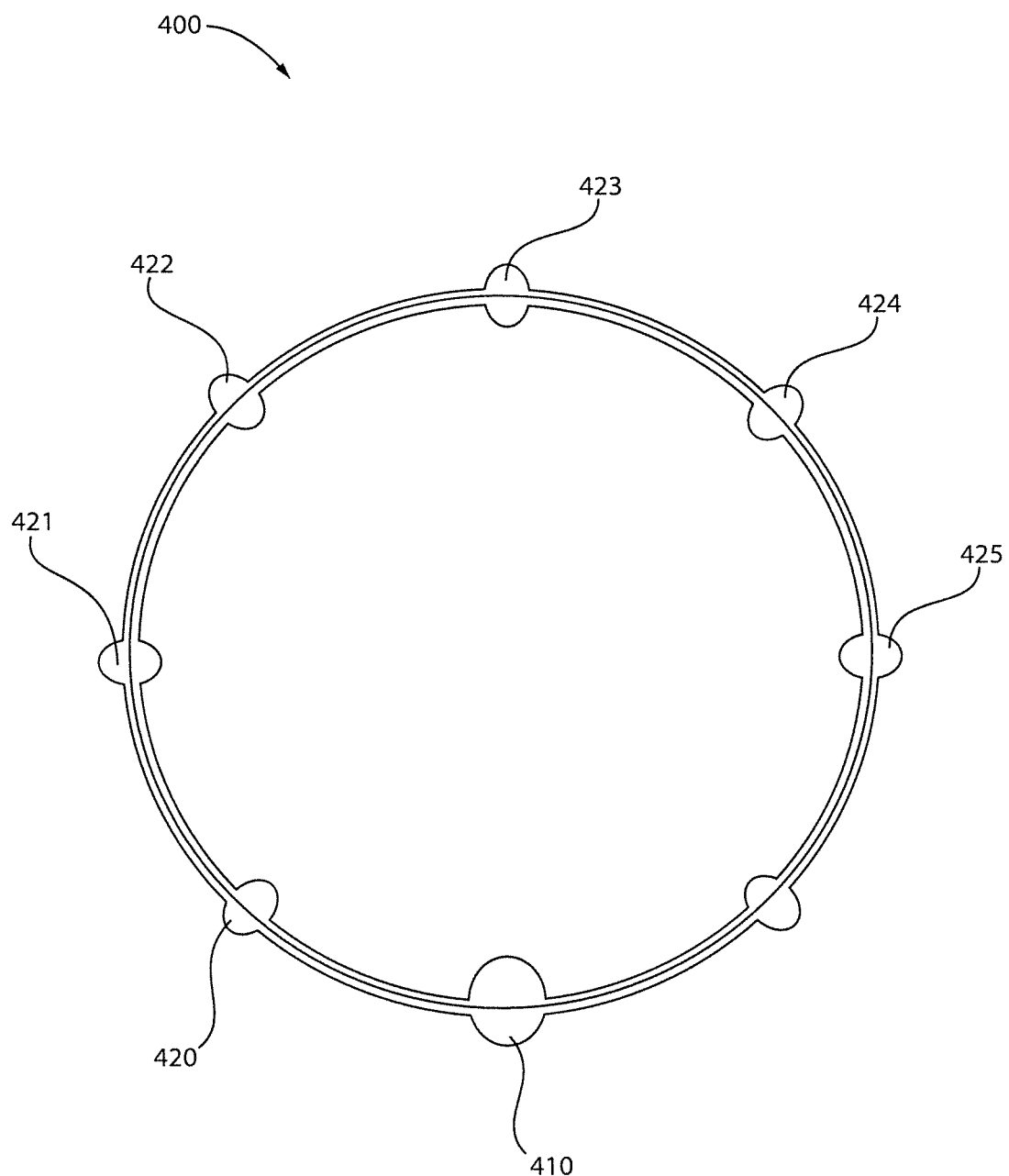
FIG. 4 is a block diagram showing an exemplary daisy-chained serial bus in a ring topology, in accordance with an embodiment of the present invention.

FIG. 4 is a block diagram showing an exemplary daisy-chained serial bus 400 in a ring topology, in accordance with an embodiment of the present invention.

The daisy-chained serial bus 400 include a controlling node 410 and controlled nodes #0-#6 420-426.

Figure 5:
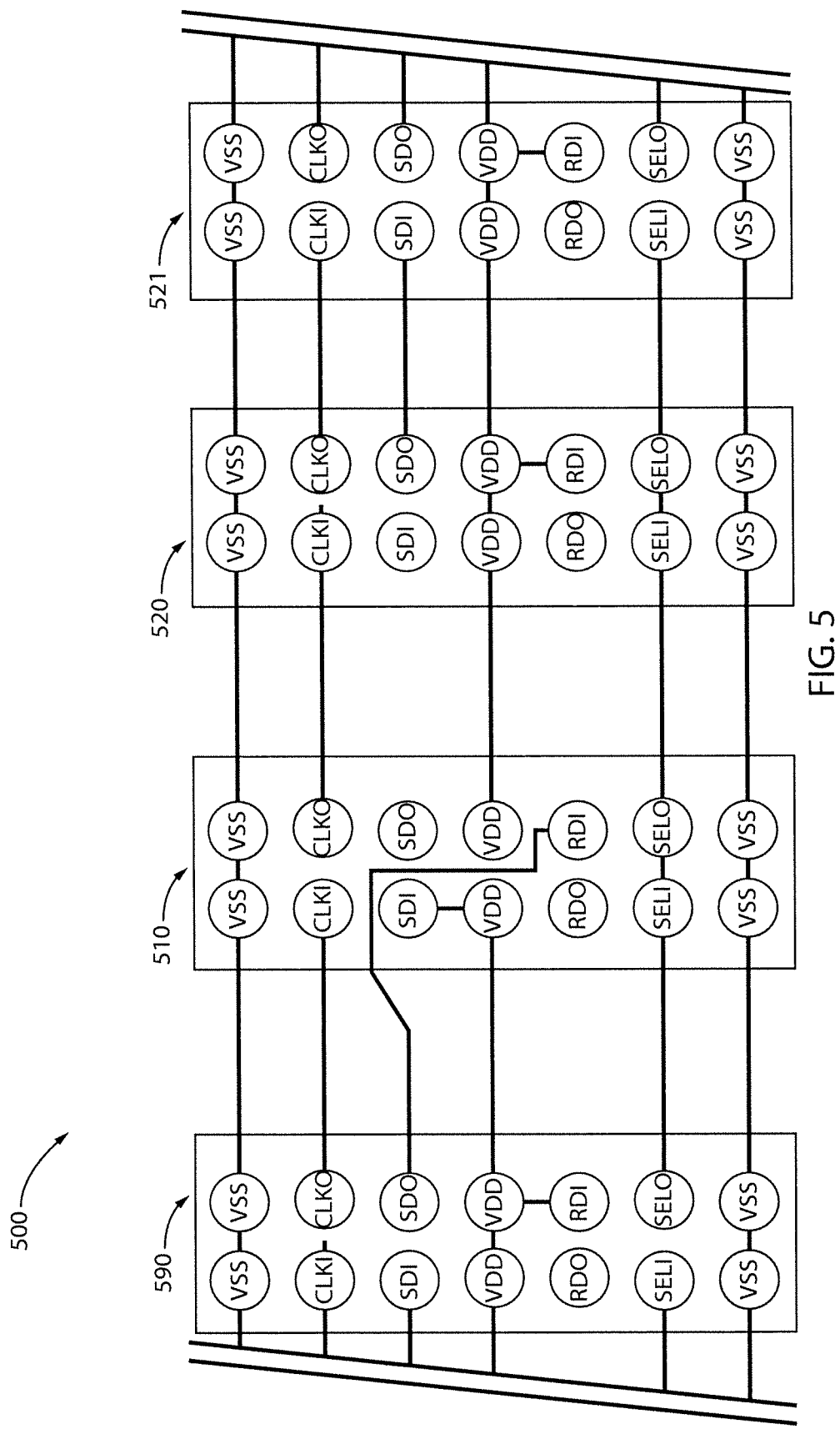
FIG. 5 is a block diagram showing an exemplary daisy-chained serial bus having an I/O pad layout and wire connections in a ring topology, in accordance with an embodiment of the present invention.

FIG. 5 is a block diagram showing an exemplary daisy-chained serial bus 500 having an I/O pad layout and wire connections in a ring topology, in accordance with an embodiment of the present invention.

The daisy-chained serial bus 500 includes a controlling node 510, a controlled node #0 520, and a controlled node #1 521 through controlled node #n 590.

Figure 6:
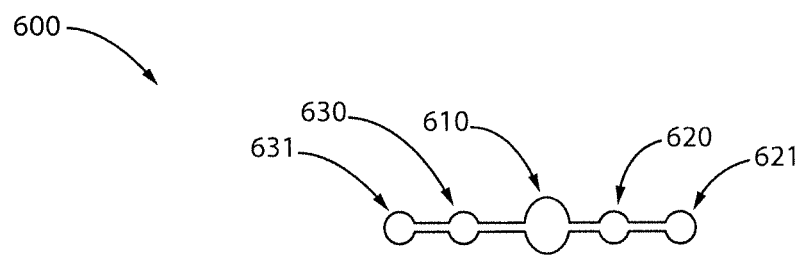
FIG. 6. is a block diagram showing an exemplary daisy-chained serial bus having a star topology, in accordance with an embodiment of the present invention.

FIG. 6. is a block diagram showing an exemplary daisy-chained serial bus 600 having a star topology, in accordance with an embodiment of the present invention.

The daisy-chained serial bus 600 include a controlling node 610 having 2 channels/lines, each with two controlled nodes. A first line has controlled nodes 620 and 621. A second line has controlled nodes 630 and 631. The controlled nodes 621 and 631 are end controlled nodes.

Figure 7:
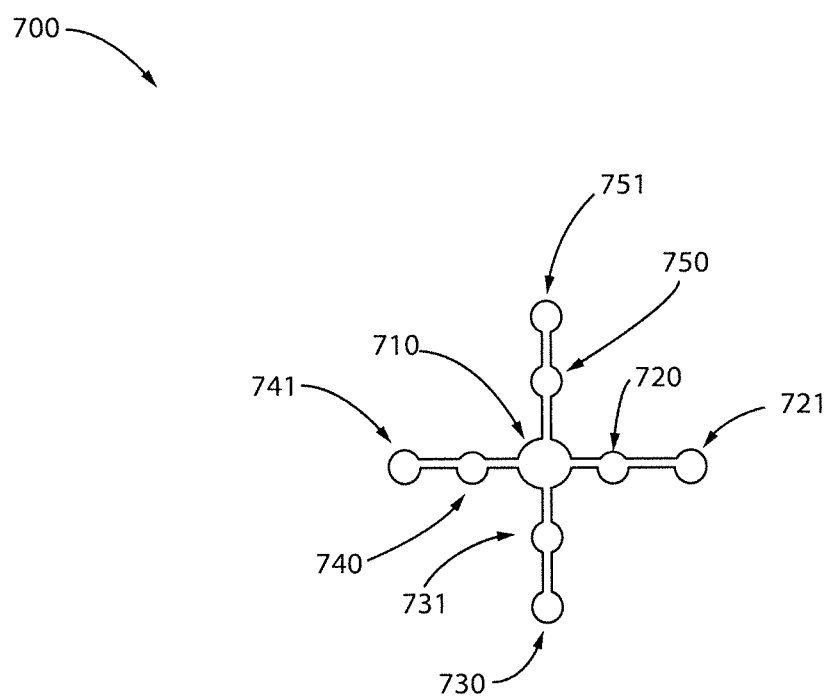
FIG. 7. is a block diagram showing an exemplary daisy-chained serial bus having another star topology, in accordance with an embodiment of the present invention.

FIG. 7. is a block diagram showing an exemplary daisy-chained serial bus 700 having another star topology, in accordance with an embodiment of the present invention.

The daisy-chained serial bus 700 include a controlling node 710 having 4 channels/lines, each with two controlled nodes. A first line has controlled nodes 720 and 721. A second line has controlled nodes 730 and 731. A third line has controlled nodes 740 and 741. A fourth line has controlled nodes 750 and 751. The controlled nodes 721, 731, 741, and 751 are end controlled nodes.

Figure 8:
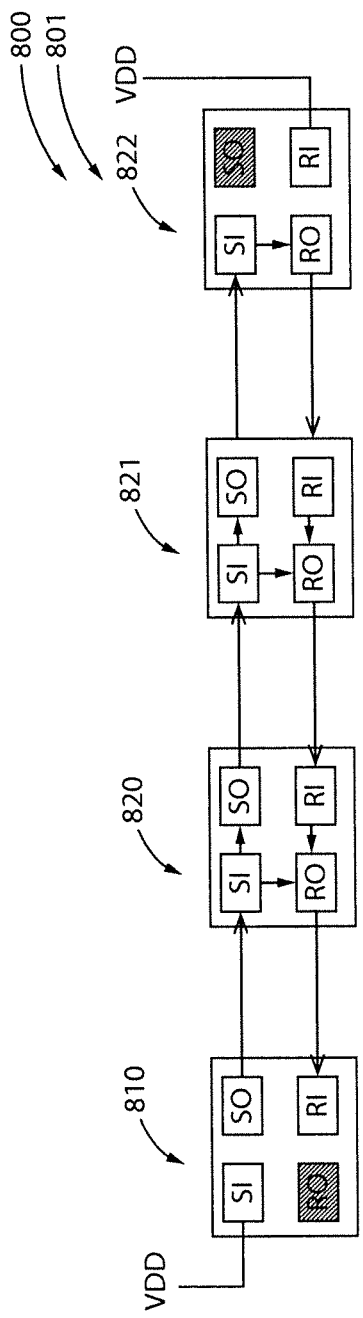
FIG. 8 is a block diagram showing exemplary data signal paths for a daisy-chained serial bus in a single line topology, in accordance with an embodiment of the present invention.

FIG. 8 is a block diagram showing exemplary data signal paths 801 for a daisy-chained serial bus 800 in a single line topology, in accordance with an embodiment of the present invention. The single line topology includes a controlling node 810 and controlled nodes #0-#2 820-822, with controlled node #2 822 being a controlled end node. At the controlling node 810, SI=VDD. At the controlled (end) node #2 822, RI=VDD.

Figure 9:
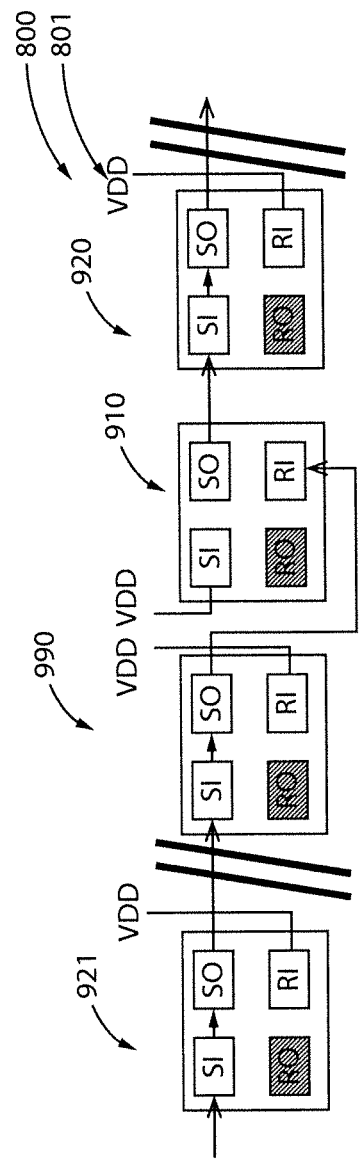
FIG. 9 is a block diagram showing exemplary data signal paths for a daisy-chained serial bus in a ring line topology, in accordance with an embodiment of the present invention.

FIG. 9 is a block diagram showing exemplary data signal paths 901 for a daisy-chained serial bus 900 in a ring line topology, in accordance with an embodiment of the present invention. The ring topology lacks a controlled end. The ring topology includes a controlling node 910 and controlled nodes #0-#n 920-990. At the controlling node 910, SI=VDD. At each of the controlled nodes #0-#n 920-990, RI=VDD.

Figure 10:
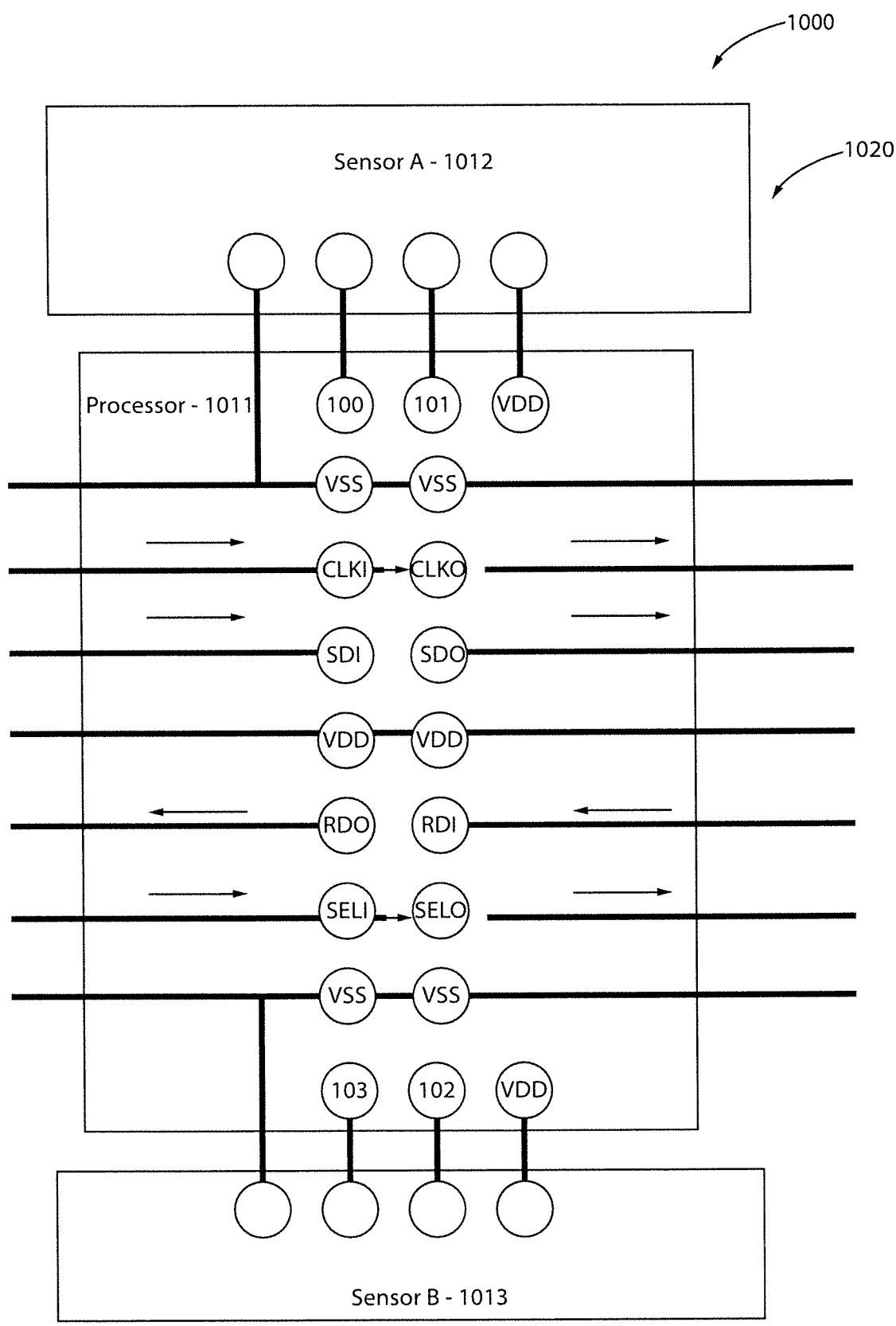
FIG. 10 is a block diagram showing an exemplary I/O pad layout, in accordance with an embodiment of the present invention.

FIG. 10 is a block diagram showing an exemplary I/O pad layout 1000, in accordance with an embodiment of the present invention. The I/O pad layout 1000 includes controlled nodes 1020 implemented on a processor chip 1011 and two sensor chips 1012 and 1013.

Figure 11:
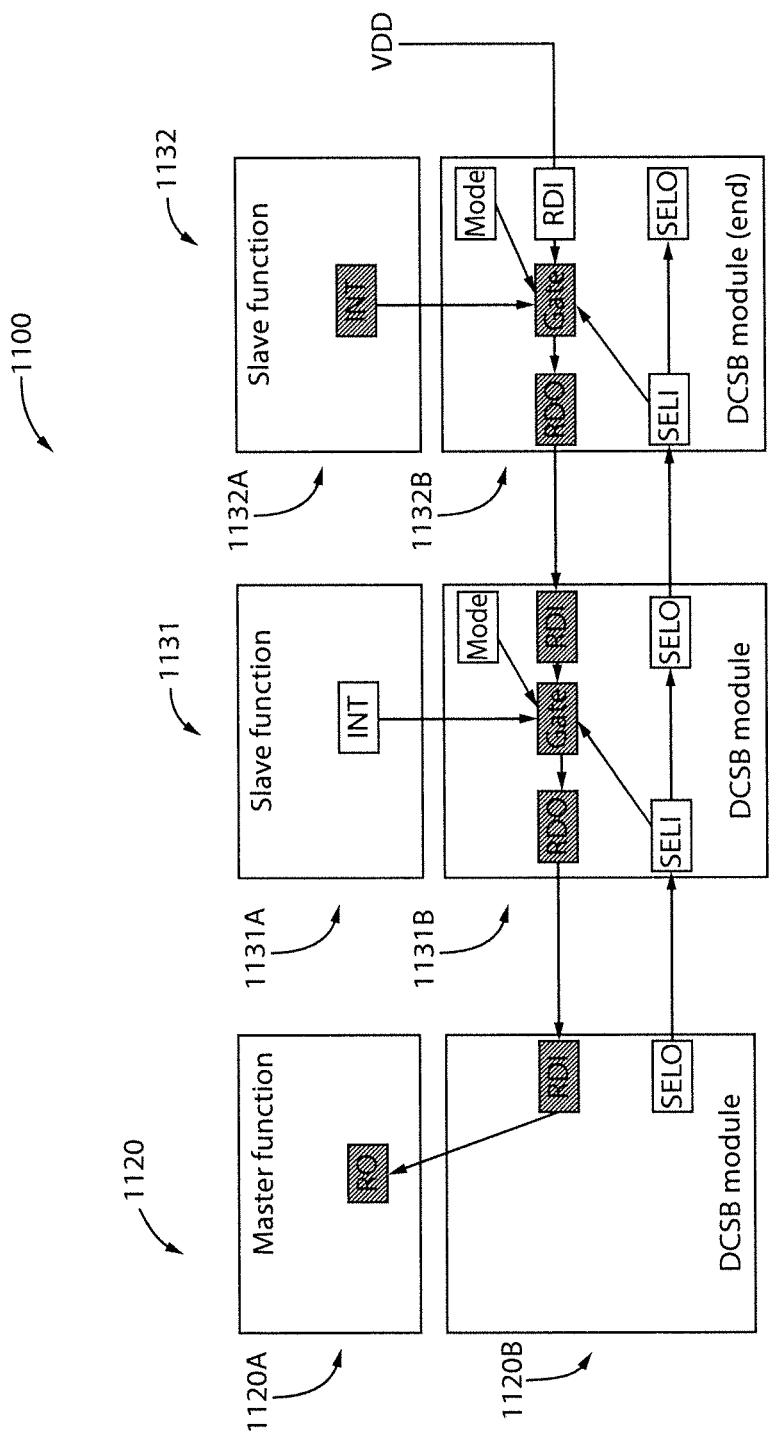
FIG. 11 is a block diagram showing an exemplary daisy-chained serial bus having interrupt support, in accordance with an embodiment of the present invention.

FIG. 11 is a block diagram showing an exemplary daisy-chained serial bus 1100 having interrupt support, in accordance with an embodiment of the present invention.

Figure 12:
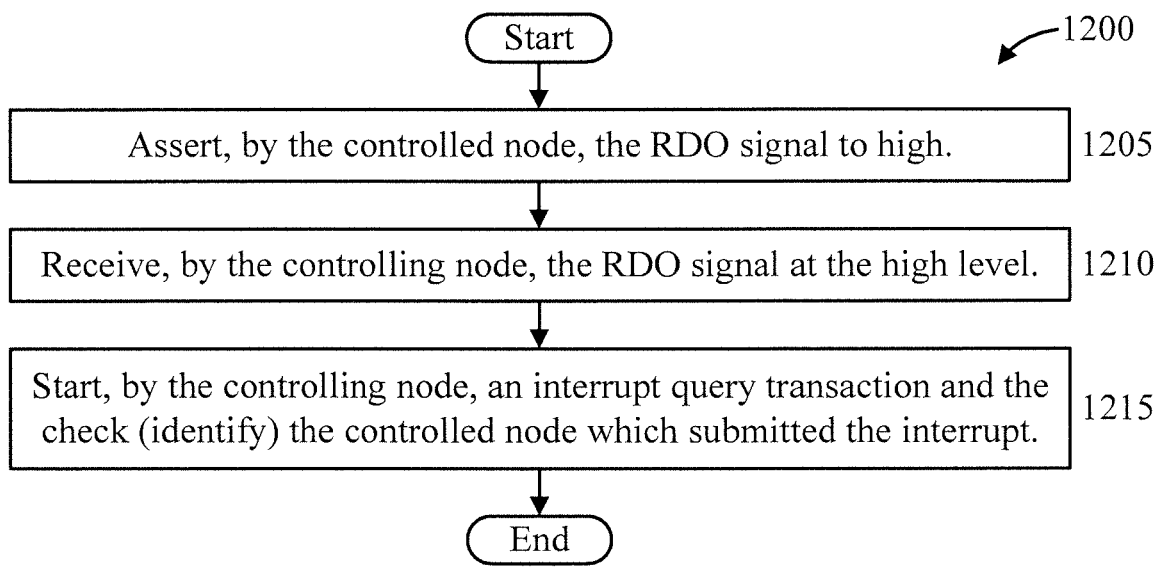
FIG. 12 is a flow diagram showing an exemplary method for providing interrupt support to the daisy-chained serial bus of FIG. 11, in accordance with an embodiment of the present invention.

FIG. 12 is a flow diagram showing an exemplary method 1200 for providing interrupt support to the daisy-chained serial bus 1100 of FIG. 11, in accordance with an embodiment of the present invention.

The daisy-chained serial bus 1100 includes a controlling node 1120 and controlled node 1131 and 1132. The controlling node includes a function 1120A and a DCSB (Daisy-Chained Serial Bus) module 1120B, the controlled node 1131 includes a function 1131A and a DCSB module 1131B, and the controlled node 1132 includes a function 1132A and a DCSB module 1132B. Each of the functions 1120A, 1131A, and 1132A can be implemented by respective processors resident at these nodes 1120, 1131, and 1132, respectively.

In a bus sleep state, there is no clock signal or selection signal on the bus.

At block 1210, assert, by the controlled, the RDO signal to high.
 rmode: select response signal source, rmode=0 @ end node
 RDO=MUX(rmode, RDI, RD) or (INT & !SELI).

At block 1220, receive, by the controlling, the RDO signal at the high level. At this point, the controlling does not know which controlled node asserted the interrupt.

At block 1230, start, by the controlling, an interrupt query transaction and the check (identify) the controlled node which submitted the interrupt.

Figure 13:
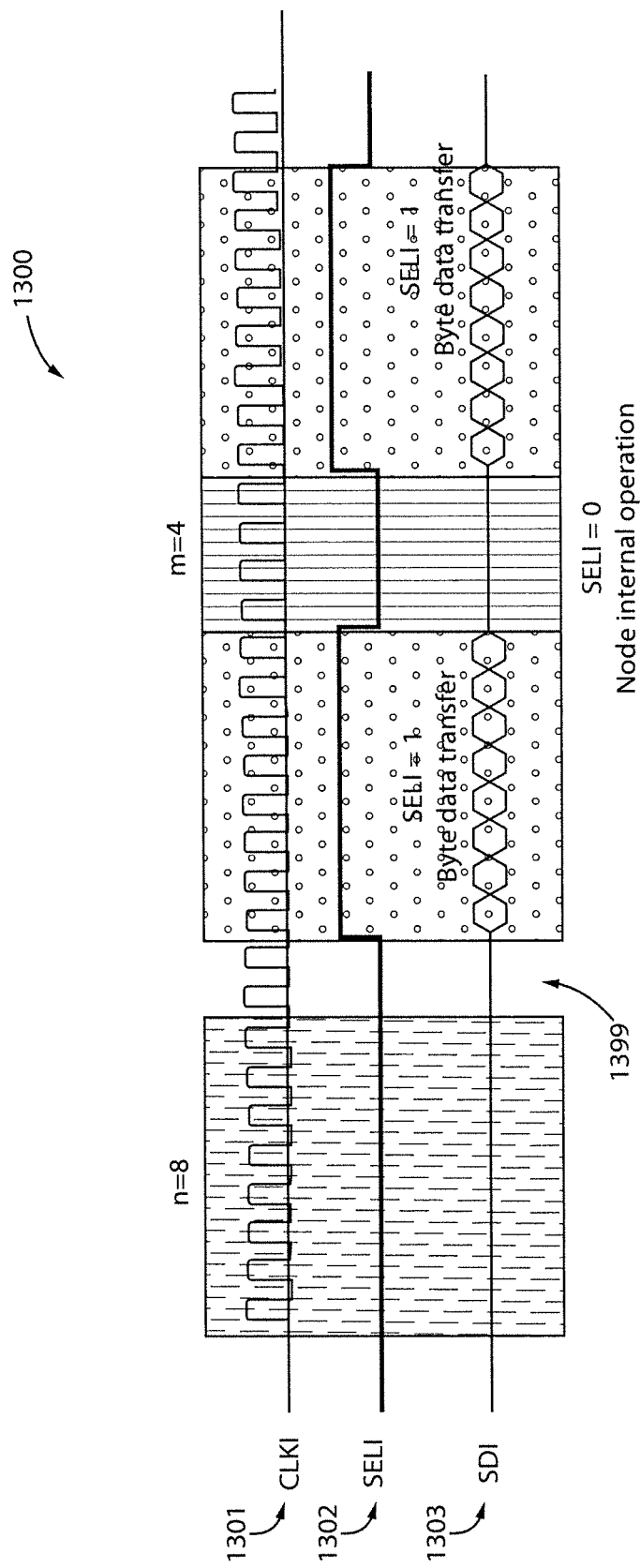
FIG. 13 is a timing diagram showing exemplary signal timings for various signals for resetting a controlled node of a daisy-chained serial bus having a controlling node and multiple controlled nodes, in accordance with an embodiment of the present invention.

FIG. 13 is a timing diagram showing exemplary signal timings 1300 for various signals for resetting a controlled node of a daisy-chained serial bus having a controlling node and multiple controlled nodes, in accordance with an embodiment of the present invention.

The signal timings 1300 relate to a CLKI signal 1301, a SELI signal 1302, and a SDI signal 1302.

When the SELI signal is high (=1), the same corresponds to a byte data transfer.

When the SELI signal is low (=0), the same corresponds to a node internal operation.
 SEL=0, n clock inputs=>reset node
 m clock inputs occurring between two occurrences of SEL=1=>node internal operation (m<n).

All node functions/logics can be driven by the bus clock (CLKI).

In the example of FIG. 13, n=8, and m=4, where n clock pulses reset 1399 a node and m clock pulses between SEL=1

Figure 14:
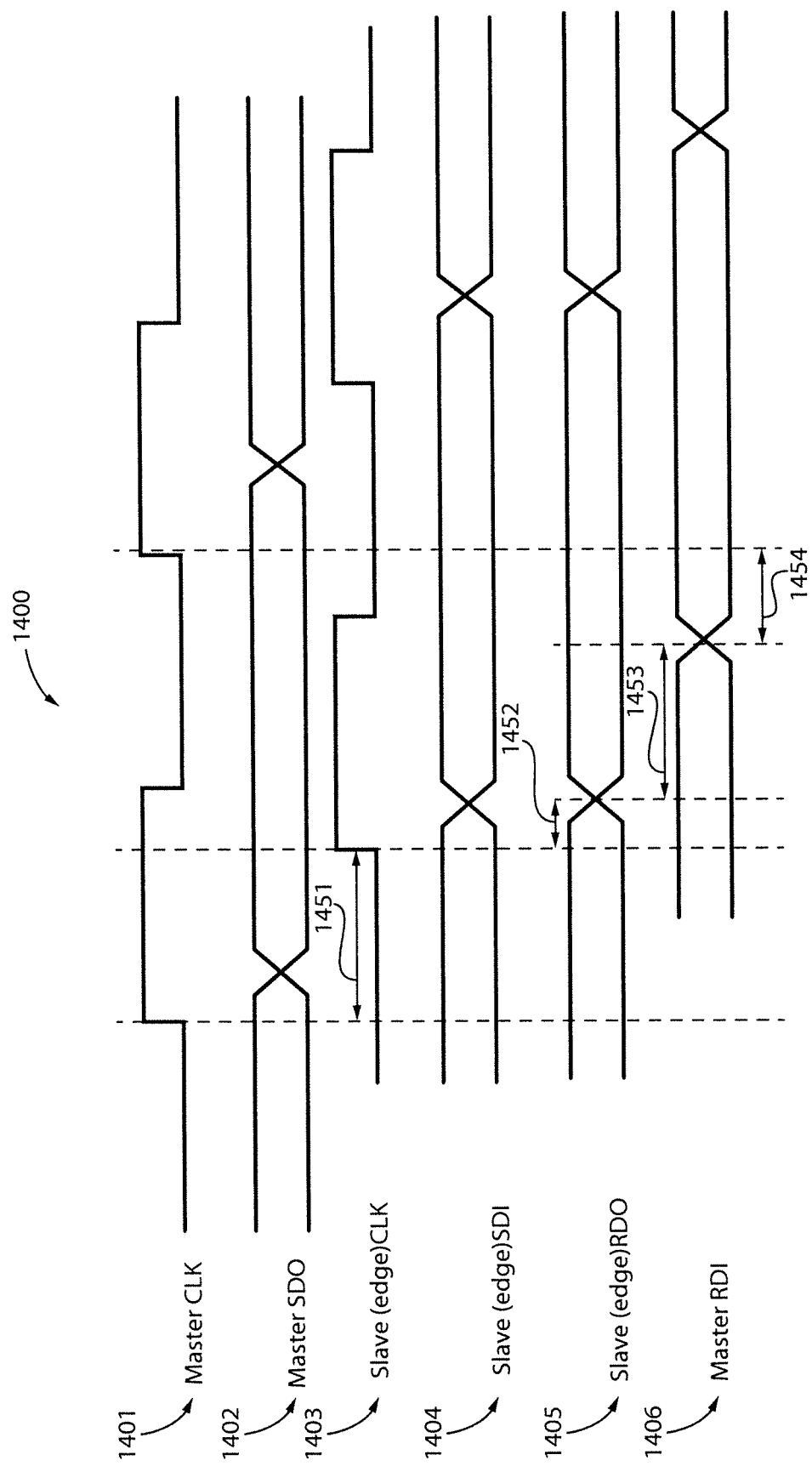
FIG. 14 is a timing diagram showing exemplary signal timings relating to a data rate of a daisy-chained serial bus, in accordance with an embodiment of the present invention.

FIG. 14 is a timing diagram showing exemplary signal timings 1400 relating to a data rate of a daisy-chained serial bus, in accordance with an embodiment of the present invention.

The signal timings 1400 relate to a controlling CLK signal 1401, a controlling SDO signal 1402, a controlled (Edge) CLK signal 1403, a controlled (edge) SDI signal 1404, a controlled (edge) RDO signal 1405, and a controlling RDI signal 1406.

For short node distances (e.g., traversals of less than 8 nodes), use shared clock and select signals. While 8 nodes is used as an exemplary node value, other node values can be used in other examples, as the number of nodes can depend on the node-to-node distance.

For long distances (e.g., traversals of equal to or more than 8 nodes) each node drives the clock and select signals. While 8 nodes is used as an exemplary node value, other node values can be used in other examples, as the number of nodes can depend on the node-to-node distance.

Periods of interest include: a controlling to controlled edge delay 1451; a data out delay 1452; a controlled edge to controlling delay 1453; and a setup 1454.

The clock period>(controlling to controlled edge delay 1451)×2+(data out delay 1452)+(setup 1454).

Regarding signal integrity and noise, noise and errors are detected using CRC in the frame.

Signal integrity and noise are mitigated by ground shielding.

The signals can be differential signals, but such an arrangement will increase the pin count.

Figure 15:
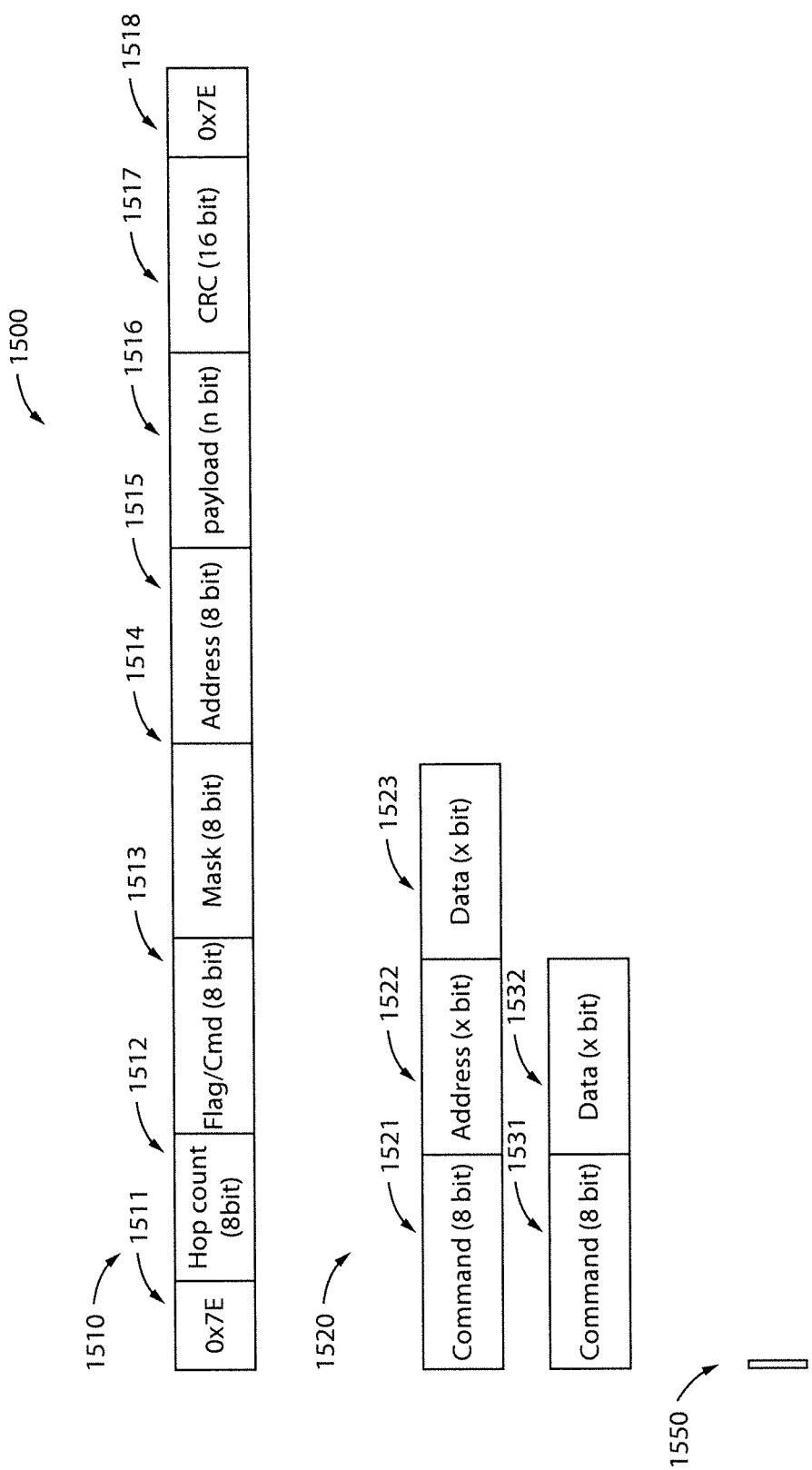
FIG. 15 is a block diagram showing frame and payload formats, in accordance with an embodiment of the present invention.

FIG. 15 is a block diagram showing frame and payload formats 1500, in accordance with an embodiment of the present invention.

The frame and payload formats 1500 include a frame format 1510, a payload format 1520, a payload format field 1530, and a no payload format 1550.

The frame format 1510 includes a start flag (0x7E) 1511, an 8-bit hop count field 1512, an 8-bit flag/cmd (command) field 1513, an 8-bit mask field 1514, an 8-bit address field 1515, an n-bit payload field 1516, a 16-bit CRC field 1517, and a suffix field 1518. The prefix field 1511 and close flag (0x7E) 1518.

The payload format 1520 includes an 8-bit command field 1521, an x-bit address field 1522, and an x-bit data field 1523, and also another 8-bit command field 1531 and another x-bit data field 1532. The no payload format 1550 has N=0.

Figure 16:
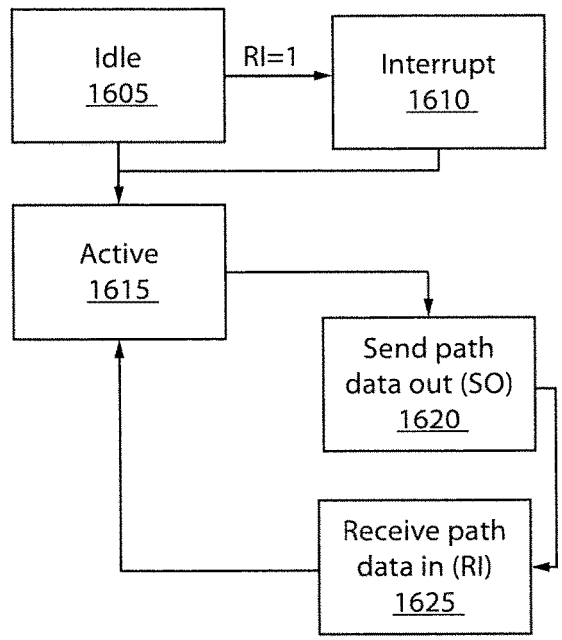
FIG. 16 is a state flow diagram for a controlling node in a daisy-chained serial bus, in accordance with an embodiment of the present invention.

FIG. 16 is a state flow diagram for a controlling node in a daisy-chained serial bus, in accordance with an embodiment of the present invention.

At block 1605, commence/remain in an idle state.
At block 1610, responsive to RI=1, initiate an interrupt.
At block 1615, enter an active state.
At block 1620, send path data out (SO).
At block 1625, receive path data in (RI).

Figure 17:
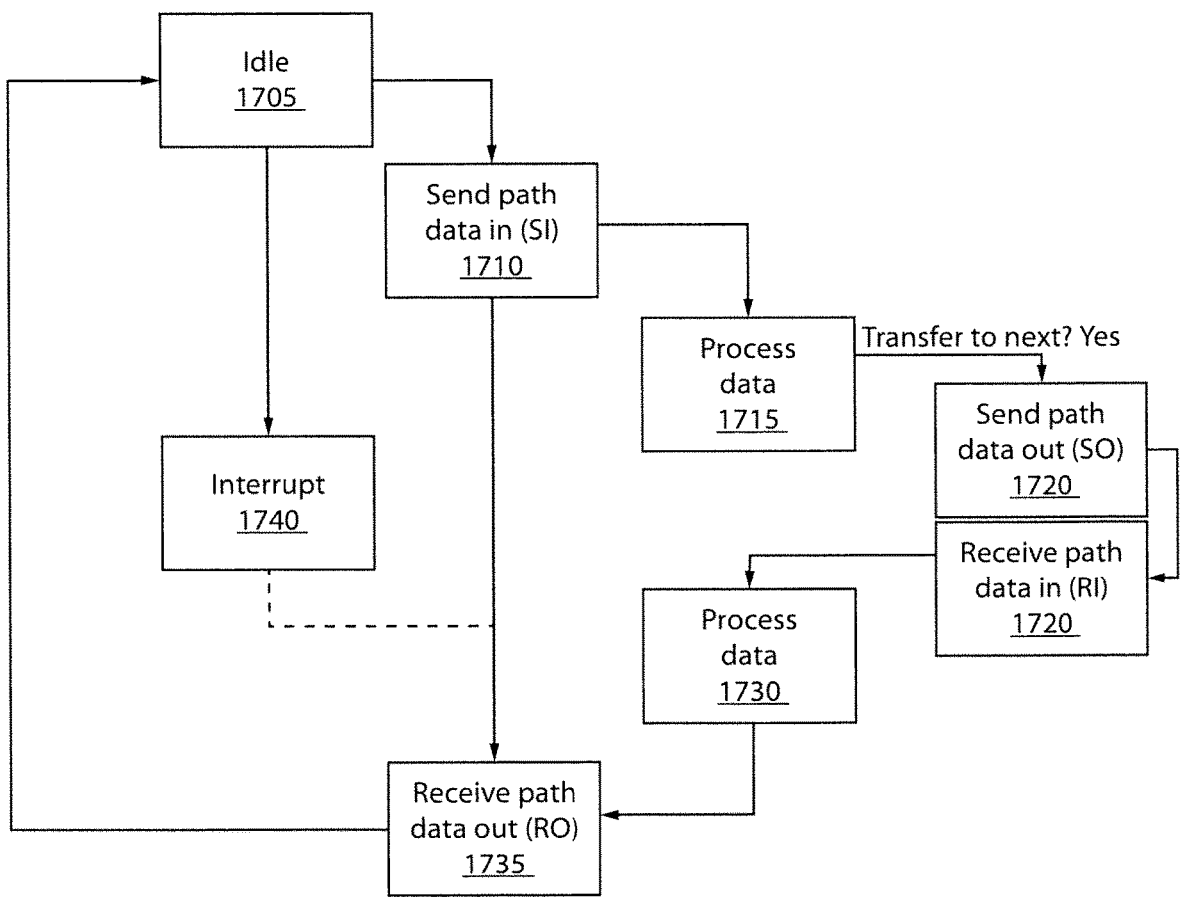
FIG. 17 is a state flow diagram for a controlled node in a daisy-chained serial bus, in accordance with an embodiment of the present invention.

FIG. 17 is a state flow diagram for a controlled node in a daisy-chained serial bus, in accordance with an embodiment of the present invention.

At block 1705, commence/remain in an idle state.
At block 1710, send path data in (SI).
At block 1715, process data and determine whether to transfer (the data) to the next node. If so, then proceed to block 1720. Otherwise, proceed to block 1735.
At block 1720, send path data out (SO).
At block 1725, receive path data in (RI).
At block 1730, process the data.
At block 1735, receive path data out (RO).
At block 1740, receive an interrupt.

Figure 18:
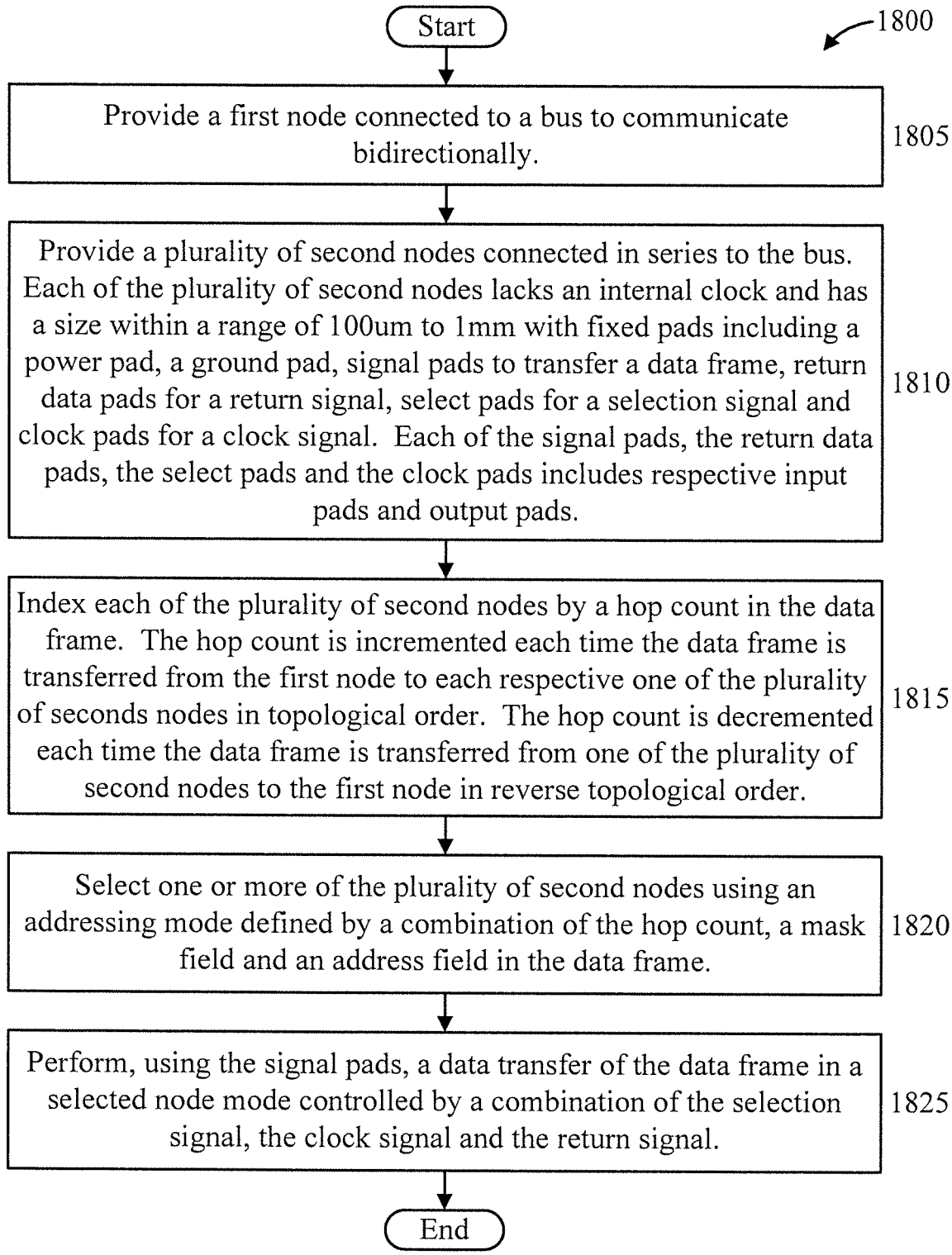
FIG. 18 is a flow diagram showing an exemplary method for data transfer using a daisy-chained serial bus, in accordance with an embodiment of the present invention.

FIG. 18 is a flow diagram showing an exemplary method 1800 for data transfer using a daisy-chained serial bus, in accordance with an embodiment of the present invention.

At block 1805, provide a first node connected to a bus to communicate bidirectionally.

At block 1810, provide a plurality of second nodes connected in series to the bus. Each of the plurality of second nodes lacks an internal clock and has a size within a range of 100 um to 1 mm with fixed pads including a power pad, a ground pad, signal pads to transfer a data frame, return data pads for a return signal, select pads for a selection signal and clock pads for a clock signal. Each of the signal pads, the return data pads, the select pads and the clock pads includes respective input pads and output pads.

At block 1815, index each of the plurality of second nodes by a hop count in the data frame. The hop count is incremented each time the data frame is transferred from the first node to each respective one of the plurality of seconds nodes in topological order. The hop count is decremented each time the data frame is transferred from one of the plurality of second nodes to the first node in reverse topological order. In this way, storage of individual IDs at the controlled nodes is not required or used. In an embodiment, at least one of the controlled nodes lacks non-volatile storage capability, as the same is not required to store device IDs in view of the hop count in the data frame.

At block 1820, select one or more of the plurality of second nodes using an addressing mode defined by a combination of the hop count, a mask field and an address field in the data frame.

At block 1825, perform, using the signal pads, a data transfer of the data frame in a selected node mode controlled by a combination of the selection signal, the clock signal and the return signal. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An apparatus for data transfer, comprising;
   a first node connected to a bus to communicate bidirectionally; and
   a plurality of second nodes connected in series to the bus, each of the plurality of second nodes lacking an internal clock and having fixed pads including a power pad, a ground pad, signal pads to transfer a data frame, return data pads for a return signal, select pads for a selection signal and clock pads for a clock signal, wherein each of the signal pads, the return data pads, the select pads and the clock pads comprise respective input pads and output pads,
   wherein each of the plurality of second nodes is indexed by a hop count in the data frame, the hop count being incremented each time the data frame is transferred from the first node to each respective one of the plurality of seconds nodes having six pad types in topological order,
   wherein each of the plurality of second nodes is selectable using an addressing mode defined by a combination of the hop count, a mask field and an address field in the data frame,
   wherein the signal pads are used for data transfer of the data frame in a selected node mode controlled by a combination of the selection signal, the clock signal and the return signal; and
   wherein the addressing mode comprises:
      a single node addressing mode defined by any of the hop count and the address field,
      a group of nodes addressing mode defined by a combination of any of (i) the hop count and the mask field and (ii) the address field and the mask field, and
      a broadcasting addressing mode that uses each of the hop count, the address field, and the mask field.

2. The apparatus of claim 1, wherein the return signal is used for an interrupt signal transfer from any of the plurality of second nodes to the first node when the selection signal is inactive.

3. The apparatus of claim 1, wherein the first node and the plurality of second nodes are connected using a line topology.

4. The apparatus of claim 1, wherein the first node and the plurality of second nodes are connected using a ring topology.

5. The apparatus of claim 1, wherein the first node and the plurality of second nodes are connected using a star topology.

6. The apparatus of claim 1, wherein the data frame is a High Level Data Link Control (HLDLC) data frame.

7. The apparatus of claim 1, wherein the hop count is decremented each time the data frame is transferred from one of the plurality of second nodes to the first node in reverse topological order.

8. The apparatus of claim 1, wherein the selected node mode is selected from a group of node modes comprising:
   a first node mode for indicating that the signal pins are used for data transfer, responsive to the selection signal being active,
   a second node mode for resetting the plurality of second nodes by the first node, responsive to the selection signal being inactive and the clock signal being active, and
   a third node mode for generating an interrupt by any of the plurality of second nodes, responsive to the selection signal being inactive and the return signal being active.

9. The apparatus of claim 8, wherein the clock signal being active comprises n pulses, wherein n is an integer settable by a user.

10. The apparatus of claim 1, wherein at least some of the plurality of second nodes are implemented on at least one of a processor chip and one or more sensor chips.

11. The apparatus of claim 1, wherein at least one of the selection signal, the clock signal, and the return signal is a differential signal.

12. The apparatus of claim 1, wherein the apparatus is formed without a dedicated node-type defining pad.

13. The apparatus of claim 1, wherein the hop count is comprised in a hop count field that uses one byte for a second node chain of up to 256 second nodes.

14. The apparatus of claim 1, wherein the first node is configured as a controlling node and the plurality of second nodes are configured as controlled nodes.

15. The apparatus of claim 1, wherein a receipt of m clock pulses between two consecutive active selection signals initiates an internal node operation, wherein m is an integer settable by a user.

16. The apparatus of claim 1, wherein each of the plurality of second nodes has a size within a range of 100 um to 1 mm.

17. A method for data transfer, comprising:
providing a first node connected to a bus to communicate bidirectionally; and
providing a plurality of second nodes connected in series to the bus, each of the plurality of second nodes lacking an internal clock and having fixed pads including a power pad, a ground pad, signal pads to transfer a data frame, return data pads for a return signal, select pads for a selection signal and clock pads for a clock signal, wherein each of the signal pads, the return data pads, the select pads and the clock pads comprise respective input pads and output pads,
wherein each of the plurality of second nodes is indexed by a hop count in the data frame, the hop count being incremented each time the data frame is transferred from the first node to each respective one of the plurality of seconds nodes having six pad types in topological order,
wherein each of the plurality of second nodes is selectable using an addressing mode defined by a combination of the hop count, a mask field and an address field in the data frame,
wherein the signal pads are used for data transfer of the data frame in a selected node mode controlled by a combination of the selection signal, the clock signal and the return signal; and
wherein the addressing mode comprises:
a single node addressing mode defined by any of the hop count and the address field,
a group of nodes addressing mode defined by a combination of any of (i) the hop count and the mask field and (ii) the address field and the mask field, and
a broadcasting addressing mode that uses each of the hop count, the address field, and the mask field.

18. The method of claim 17, wherein the return signal is used for an interrupt signal transfer from any of the plurality of second nodes to the first node when the selection signal is inactive.

19. The method of claim 17, wherein the hop count is decremented each time the data frame is transferred from one of the plurality of second nodes to the first node in reverse topological order.

20. The method of claim 17, wherein the selected node mode is selected from a group of node modes comprising:
a first node mode for indicating that the signal pins are used for data transfer, responsive to the selection signal being active,
a second node mode for resetting the plurality of second nodes by the first node, responsive to the selection signal being inactive and the clock signal being active, and
a third node mode for generating an interrupt by any of the plurality of second nodes, responsive to the selection signal being inactive and the return signal being active.

21. The method of claim 20, wherein the clock signal being active comprises n pulses, wherein n is an integer settable by a user.

22. The method of claim 17, wherein at least some of the plurality of second nodes are implemented on at least one of a processor chip and one or more sensor chips.

23. An apparatus for data transfer, comprising:
a first node connected to a bus to communicate bidirectionally; and
a plurality of second nodes connected in series to the bus, each of the plurality of second nodes lacking an internal clock and having fixed pads including a power pad, a ground pad, signal pads to transfer a data frame, return data pads for a return signal, select pads for a selection signal and clock pads for a clock signal, wherein each of the signal pads, the return data pads, the select pads and the clock pads comprise respective input pads and output pads,
wherein each of the plurality of second nodes is indexed by a hop count in the data frame, the hop count being incremented each time the data frame is transferred from the first node to each respective one of the plurality of seconds nodes having six pad types in topological order,
wherein each of the plurality of second nodes is selectable using an addressing mode defined by a combination of the hop count, a mask field and an address field in the data frame,
wherein the signal pads are used for data transfer of the data frame in a selected node mode selected from:
a first node mode for indicating that the signal pins are used for data transfer, responsive to the selection signal being active,
a second node mode for resetting the plurality of second nodes by the first node, responsive to the selection signal being inactive and the clock signal being active, and
a third node mode for generating an interrupt by any of the plurality of second nodes, responsive to the selection signal being inactive and the return signal being active; and
wherein the addressing mode comprises:
a single node addressing mode defined by any of the hop count and the address field,
a group of nodes addressing mode defined by a combination of any of (i) the hop count and the mask field and (ii) the address field and the mask field, and
a broadcasting addressing mode that uses each of the hop count, the address field, and the mask field.

* * * * *